United States Patent [19]

Poindexter

[11] 4,026,763
[45] May 31, 1977

[54] LIQUID-METAL DIP SEAL WITH PNEUMATIC SPRING

[75] Inventor: Allan M. Poindexter, Pleasant Hills, Pa.

[73] Assignee: The United States Energy Research and Development Administration, Washington, D.C.

[22] Filed: Apr. 12, 1976

[21] Appl. No.: 675,845

[52] U.S. Cl. .................................. 176/87; 176/37; 137/251
[51] Int. Cl.$^2$ ...................................... G21C 13/06
[58] Field of Search .................. 176/37, 40, 50, 87; 137/246, 251

[56] References Cited

UNITED STATES PATENTS

| | | | |
|---|---|---|---|
| 2,991,905 | 7/1961 | Monson et al. | 176/87 X |
| 2,995,505 | 8/1961 | Guild | 176/87 X |
| 3,253,996 | 5/1966 | Bond, Jr. et al. | 137/251 X |
| 3,522,144 | 7/1970 | Webb et al. | 176/50 |
| 3,713,461 | 1/1973 | Noteltiers | 137/246 X |
| 3,819,478 | 6/1974 | Thorel et al. | 176/87 |

OTHER PUBLICATIONS

Proc. of the Breeder Reactor Corp., *Proposed Reference Design for the Clinch River Breeder Reactor Plant*, ERDA Tech. Inf. Center, P.O. Box 62, Oak Ridge, Tenn. 37830, CONF–741087, Oct. 1974, pp. 20–24.
Yevick et al., *Fast Reactor Technology: Plant Design*, MIT Press, 1966, pp. 368 & 369.

*Primary Examiner*—Peter A. Nelson
*Attorney, Agent, or Firm*—Dean E. Carlson; Arthur A. Churm; Joseph N. Hosteny

[57] ABSTRACT

An improved liquid-metal dip seal for sealing the annulus between rotating plugs in the reactor vessel head of a liquid-metal fast-breeder nuclear reactor has two legs of differing widths communicating under a seal blade; the wide leg is also in communication with cover gas of the reactor and the narrow leg is also in communication with an isolated plug annulus above the seal. The annulus contains inert gas which acts as a pneumatic spring. Upon increasing cover gas pressure which depresses the level in the wide leg and greatly increases the level in the narrow leg, the pneumatic spring is compressed, and resists further level changes, thus preventing radioactive cover gas from bubbling through the seal.

2 Claims, 1 Drawing Figure

U.S. Patent May 31, 1977 4,026,763
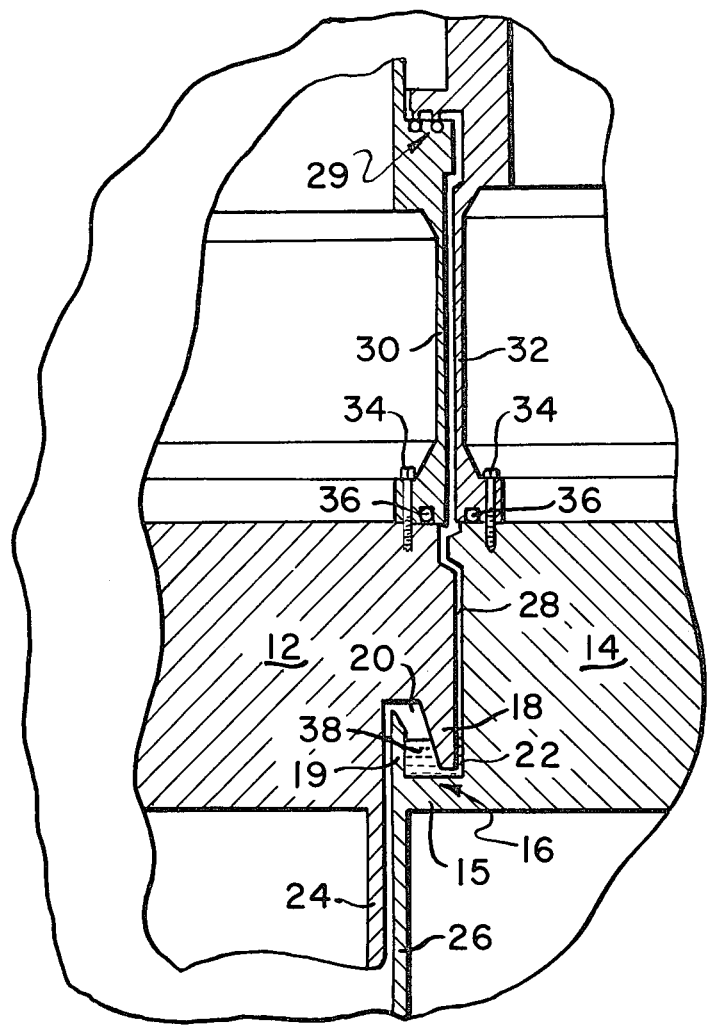

LIQUID-METAL DIP SEAL WITH PNEUMATIC SPRING

CONTRACTUAL ORIGIN OF THE INVENTION

The invention described herein was made in the course of, or under, a contract with the United States Energy Research and Development Administration.

BACKGROUND OF THE INVENTION

The invention is an improvement in a liquid-metal dip seal for a liquid-metal-cooled fast-breeder nuclear reactor which renders unnecessary a gas pressure equalization system.

Liquid-metal-cooled fast-breeder nuclear reactors ordinarily comprise a reactor core submerged in a pool of liquid-metal coolant contained in a reactor vessel. The remaining volume inside the vessel is occupied by a cover gas. The reactor vessel is closed at the top by a vessel head. See, for example, J. R. Dietrich and W. H. Zinn Ed., Solid Fuel Reactors, Addison-Wesley Publishing Company, 1958, at page 157. The vessel head contains one or more rotating plugs each nested within the next larger plug or the vessel head itself. The purpose of the rotating plugs is to position refueling tools anywhere over the reactor core. Since it is essential to prevent out-leakage of highly radioactive cover gas, the annulus between two rotating plugs, or a plug and the reactor vessel head, must be effectively sealed, both when the plugs are stationary or moving with respect to each other.

A liquid-metal dip seal is used in order to provide effective sealing between two nested rotating plugs while still permitting relative rotation between the plugs. The larger of two nested plugs has a trough located on its inner periphery; the trough is similar to a gutter and is comprised of a flange extending from the inner periphery of the larger plug, which flange serves as a trough bottom, and a side wall fixed at a right angle to the edge of the flange away from the plug. The periphery of the larger plug serves as the other side wall of the trough and the height of the side walls are determined by the desired depth of liquid metal to be contained in the trough.

The inner and smaller rotating plug has sections with two different diameters, the larger diameter section being above the smaller diameter section. A dip seal blade is pendently supported from the larger diameter section; the blade extends completely around the periphery of the smaller rotating plug. When both plugs are nested together, the dip seal blade extends into the trough on the larger rotating plug and divides the trough into two dip seal legs. The blade does not touch the bottom of the trough and therefore the legs communicate underneath the dip seal blade. The trough is then filled with liquid metal which prevents cover gas from passing underneath the seal blade and thus escaping from the reactor vessel.

The hydrostatic pressure of the seal, controlled by the depth of the liquid metal in the trough, is capable of resisting small pressure transients in the cover gas. In order to prevent excessive cover gas pressure from forcing the liquid metal in the seal out of the trough, the portion of the plug annulus above the dip seal is frequently connected via a gas pressurization system to the cover gas so that the pressure of the plug annulus above the dip seal is matched to that of the cover gas, thereby preventing excessive pressure differences on the dip seal which would overcome the hydrostatic pressure imposed by the dip seal. A cover gas pressure transient arises from, for instance, a reactor scram, which causes a contraction of the liquid metal coolant and consequent expansion of the cover gas. A cover gas makeup system reduces the magnitude of, but does not eliminate, the cover gas pressure drop as well as overshoot on the restoration of normal pressure. See, for example, Thorel et al., U.S. Pat. No. 3,819,478, issued June 25, 1974. Thorel points out at column 6, lines 64–68, and column 7, lines 1–21, that the gas pressure equalization system is an alternative to making the seals themselves deep enough to withstand reactor cover gas pressure variations.

The use of such a gas pressure equalization system has several disadvantages. First, it decreases reliability because of its added complexity and active function. Second, failure of the gas pressure equalization system to respond properly to a cover gas pressure rise would cause radioactive cover gas to bubble under the dip seal blade into the annulus above the dip seal which can result in radiation dose rates of several roentgen per hour for anyone in the vicinity of the reactor vessel head. Last, the inert gas introduced to and removed from the portion of the annulus above the dip seal may contain oxygen as a contaminant. This oxygen reacts with the liquid metal in the dip seal and forms oxides which eventually interfere with plug rotation and seal function.

SUMMARY OF THE INVENTION

The invention is a liquid-metal dip seal for sealing an annulus between nested rotating plugs in the reactor vessel head of a liquid-metal-cooled fast-breeder nuclear reactor. A trough is located on the inner periphery of the larger of the nested plugs and extends completely around the periphery. A dip seal blade pendently supported from the periphery of the smaller of the nested plugs extends downward into the trough without making contact with the bottom of the trough; the dip seal blade is offset in the trough in order to divide the trough into two legs of unequal widths. The two legs communicate with each other under the seal blade. The trough is filled with a liquid metal which partially submerges the seal blade. The free surface of the liquid metal in the wide leg is in communication with the cover gas of the reactor; the free surface of the liquid metal in the narrow leg is in communication with the annulus between the plugs which is completely isolated and filled with a constant mass of inert gas. A decreasing level in the wide leg due to an increase in cover gas pressure causes a disparate increase in the level of the narrow leg due to the difference of widths of the two legs. The increasing level in the narrow leg is resisted by the pneumatic spring effect of the inert gas in the isolated plug annulus.

It is an object of the invention to provide a dip seal which can resist cover gas pressure transients greater than the hydrostatic pressure of the dip seal without use of a gas pressure equalization system connected to the plug annulus.

BRIEF DESCRIPTION OF THE DRAWING

The only FIGURE is a partial section taken through two nested rotating plugs in the reactor vessel head of a liquid-metal-cooled fast-breeder nuclear reactor displaying a dip seal.

SPECIFIC EMBODIMENT OF THE INVENTION

The dip seal is formed by a small rotating plug 12 nested within a large rotating plug 14. Large rotating plug 14 has a gutter-like trough 16 on its inner periphery; the trough surrounds small rotating plug 12. The bottom of the trough 16 is formed by a flange 15 on the periphery of large rotating plug 14. The side walls of the trough 16 are formed by the periphery of rotating plug 14 on one side and an outer trough wall 19 on the other side which extends upwardly from the edge of the flange 15. The height of the side walls determines the depth of liquid metal which the dip seal will accommodate. The small rotating plug 12 has a larger diameter section above a smaller diameter section. Extending into trough 16 is a seal blade 18 pendently supported from the bottom of the larger diameter section of small rotating plug 12; both trough 16 and seal blade 18 extend all the way around small rotating plug 12 so that there is no gap left unsealed. The seal blade 18 divides the trough 16 into two regions of unequal width; a wide leg 20 and a narrow leg 22. Wide leg 20 is in communication with the cover gas of the reactor via an annulus between pendently supported plug skirts 24 and 26. The reactor core itself is not shown. The narrow leg 22 is in communication with a plug annulus 28 above the dip seal between rotating plugs 12 and 14, and plug risers 30 and 32. The annulus 28 is sealed by inflatable seals 29 mounted at one end of small plug riser 30 and large plug riser 32; the risers 30 and 32 also support the plugs 12 and 14. The rotating plugs 12 and 14 are at a temperature sufficient to maintain liquid sodium 38 in the dip seal in a molten condition. This temperature is approximately 200° C.

Risers 30 and 32 are attached respectively to plugs 12 and 14 by bolts 34 and are sealed to the plugs by metallic O-rings 36. Plug annulus 28 is made as narrow as possible. Hence, for a given decrease in level of liquid sodium 38 in the wide leg 20, a greater change in level of the liquid sodium 38 in the narrow leg 22 can be obtained. Plug annulus 28 is completely isolated by the dip seal and inflatable seals 29; the annulus is filled with a constant mass of inert gas which behaves as a pneumatic spring. Reducing the volume of plug annulus 28 or increasing the constant mass of inert gas in the annulus both tend to make the pneumatic spring stiffer which gives it greater capability to resist changes in cover gas pressure.

In preparation for use, the dip seal is filled with liquid sodium 38 to a level below the top of the trough 16. Plug annulus 28 is filled with inert gas to a pressure equal to that of the cover gas of the reactor and annulus 28 is then isolated. In operation, an increase in cover gas pressure acting on the free surface of the liquid sodium 38 in the wide leg 20 of the dip seal 10 will cause a volume of sodium to be displaced from the wide leg into the narrow leg 22. Due to the substantial difference in widths of the legs 20 and 22, the level of liquid sodium 38 in the narrow leg 22 will rise much more than the level in the wide leg 20 has fallen, since the displaced volume of liquid sodium 38 in the wide leg must show up as an increased volume of liquid sodium in the narrow leg 22. The rising level in the narrow leg 22 decreases the volume of the inert gas occupying plug annulus 28, thus continuously increasing its pressure to follow that of the cover gas, much as an ordinary metal spring resists compression. The gas compression creates a restoring force acting on the surface of the liquid sodium 38 in the narrow leg 22 which resists further transfer of liquid sodium 38 from the wide leg to the narrow leg.

With this greatly increased restoring force, the capability of the dip seal to resist increases in cover gas pressure is increased sufficiently to dispense with the gas pressure equalization system. Hence, the passive pneumatic spring formed by the constant mass of inert gas in plug annulus 28 has replaced the previously mentioned active gas pressure equalization system which must add gas to, or take it away from, plug annulus 28 to make the pressure in the annulus follow cover gas pressure.

One suitable dip seal design has a wide leg 20 about 4 inches wide, a narrow leg 22 about ½ inch wide, and a depth of liquid sodium 38 of 3½ to 4 inches.

For these dimensions, calculations indicate that the dip seal is capable of resisting a cover gas pressure increase of about 3 pounds per square inch without allowing the level of liquid sodium 38 in the wide leg 20 to fall below the seal blade 18 which would permit cover gas to bubble into the plug annulus 28 and thence between risers 30 and 32 which would give rise to a severe increase in radiation dose rates. This is 12 to 15 times the pressure increase which a vented dip seal could resist by its hydrostatic pressure alone.

The embodiments of the invention in which an exclusive property or privilege is claimed are defined as follows:

1. In a liquid-metal cooled nuclear reactor containing cover gas and which includes a reactor vessel head containing small and large rotating plugs, the small rotating plug being nested within the large rotating plug and defining an isolated plug annulus between the plugs wherein the annulus is sealed at the top by an inflatable seal and at the bottom by the liquid-metal dip seal, the dip seal comprising:

a trough on an inner periphery of said large rotating plug and having a bottom formed by a flange extending from the inner periphery of the large rotating plug, a side wall formed by the periphery of the large rotating plug above the trough bottom, and another side wall attached at a right angle to the edge of the flange away from the large rotating plug and extending a distance upwardly therefrom;

a seal blade pendently supported from the periphery of a larger diameter section of the small rotating plug, and extending downwardly into the trough and separating the trough into a wide leg and a narrow leg substantially different in width, each in communication with the other underneath the seal blade, the wide leg also being in communication with the cover gas, and the narrow leg also being in communication with the isolated plug annulus;

a liquid metal in the trough which submerges a portion of the seal blade; and a constant mass of inert gas in the isolated plug annulus, the gas being in communication with the surface of the liquid metal in the narrow leg, whereby when the cover gas pressure increases and displaces liquid metal from the wide leg to the narrow leg, thereby causing an increase in the level of the narrow leg greater than the decrease in level of the wide leg, the constant mass of inert gas in the isolated plug annulus will be compressed and its pressure increased, thus exerting a greater restoring force on the surface of the liquid metal in the narrow leg and resisting any further decrease in the level of liquid metal in the wide leg.

2. The dip seal of claim 1 wherein the wide leg is approximately 4 inches wide, the narrow leg is approximately ½ inch wide, and the depth of liquid metal is 3 to 4 inches.

* * * * *